United States Patent [19]

Marthe

[11] Patent Number: 4,772,518

[45] Date of Patent: Sep. 20, 1988

[54] WATER REDUCIBLE ACRYLIC POLYMER FOR PRINTING OF PAPER AND POLYVINYL CHLORIDE

[75] Inventor: Jean P. Marthe, Saultain, France

[73] Assignee: PPG Industries, Inc., Pittsburgh, Pa.

[21] Appl. No.: 921,098

[22] Filed: Oct. 21, 1986

[51] Int. Cl.⁴ .................. B32B 23/08; C08F 20/58
[52] U.S. Cl. ................................ 428/511; 526/304; 526/217; 524/555; 524/796; 524/430; 428/515; 427/411
[58] Field of Search ............... 526/217, 304; 524/555, 524/796, 430; 106/20; 427/385.5, 407.1, 411; 428/515, 511

[56] References Cited

U.S. PATENT DOCUMENTS 3,925,293  12/1975  Knechtges et al. ............ 526/304
4,002,582   1/1977  Intsche ........................... 526/304

FOREIGN PATENT DOCUMENTS 59-30995  2/1984  Japan ............................. 526/304

Primary Examiner—Joseph L. Schofer
Assistant Examiner—Peter F. Kulkosky
Attorney, Agent, or Firm—Godfried R. Akorli

[57] ABSTRACT

Disclosed herein is an acrylic polymer containing an N-methylolamide group an amine group and an acid group; said polymer is useful in inks or varnishes that can be applied effectively to varied substrates such as paper and polyvinyl chloride.

16 Claims, No Drawings

WATER REDUCIBLE ACRYLIC POLYMER FOR PRINTING OF PAPER AND POLYVINYL CHLORIDE

BACKGROUND OF THE INVENTION

1. Field of the Invention

The present invention relates to acrylic polymers, and methods of preparing and using the same. More specifically, the present invention relates to acrylic polymers containing N-methylol-amide group, an amino group, and an acid group. These polymers are particularly useful in ink compositions.

2. Brief Description of the Prior Art

Acrylic polymers containing copolymers comprising N-methylol groups are known in the art. Also known in the art are acrylic polymers comprising copolymers which contain N-methylol groups and amino groups. The N-methylol groups are known to be highly reactive and susceptible to self-condensation and reaction with other sources of active hydrogen, particularly in the presence of acid groups. Consequently, compositions containing N-methylol groups can react prematurely and undesirably to form gelled compositions or otherwise become ineffective for their intended use. Hence, the art has seemingly stayed clear of preparing acrylic polymers which contain a significant amount methylol group, and acid groups in the polymer matrix.

By the present invention however, acrylic polymers containing N-methylol groups and acid groups have been prepared in such a manner as prevents or at least reduces the premature reaction and consequential gelation of compositions comprising such acrylic polymers.

SUMMARY OF THE INVENTION

In accordance with the foregoing, the present invention encompasses an acrylic polymer comprising a copolymer which is derived from (I) an ethylenically unsaturated monomer containing a N-methylol amide group, (II) an ethylenically unsaturated monomer containing a carboxyl group, (III) an ethylenically unsaturated monomer containing an amino group, and (IV) an ethylenically unsaturated monomer which is different from I, II and III. The present invention further encompasses a coating composition, particularly a water based coating composition, comprising the acrylic polymers. The present invention also encompasses a process for preparing the acrylic polymers as described above which process comprises copolymerizing ethylenically unsaturated monomers as recited above by free radical initiated polymerization in a basic solvent medium comprising a solvent, a base and water.

The present invention further encompasses an improved process of applying a varnish or ink composition to substrates, the improvement comprising effective application to varied substrates of polyvinyl chloride and paper, wherein the varnish or ink composition comprises an aqueous composition containing the acrylic polymer as recited herein above. Printed matter of paper or polyvinyl chloride which is prepared by applying thereto the above compositions is also encompassed hereby.

The acrylic polymers of this invention are prepared by free radical addition polymerization of ethylenically unsaturated monomers described herein above or precursors thereof. The N-methylol amide group containing monomers can be N-methylol acrylamide or N-methylol methacrylamide. While the N-methylol amide subclass of monomers is preferred herein, it is believed that the general class of the alkoxy methylol amides can be employed herein as well. The N-methylol amide group containing monomers are employed in amounts sufficient to impart effective cure to coating compositions containing the acrylic polymers when said coating compositions are applied to substrates, heated to appropriate cure temperatures as further described herein. Illustratively, the N-methylol amide group containing monomer can be employed in amounts of from about 1 to 12 and preferably 2 to 6 percent by weight based on the total monomer weight composition.

The ethylenically unsaturated monomer containing a carboxyl group can be an acrylic acid, methacrylic acid, itaconic acid or the like. The ethylenically unsaturated monomer containing a carboxyl group can be employed in an amount sufficient to provide a solubilizing group when neutralized with ammonia or an amine. Illustratively, the carboxyl group containing monomer can be employed in amounts of about 3 to 15 percent by weight based on the total monomer weight composition.

The amino group containing monomers can be amino alkyl esters of acrylic or methacrylic acid. Examples of the amino group containing monomers can be N,N-dimethyl amino-ethyl methacrylate, N,N-dimethyl amino-ethyl acrylate, N,N-diethyl amino ethyl methacrylate, t-butylaminoethyl methacrylate, N-methyl-N-butyl amino-ethyl methacrylate N,N-dimethyl amino-hexyl acrylate, or the like The amino group containing monomer is employed in an amount sufficient to confer good adhesion of the ink or varnish compositions to polyvinyl chloride substrate. Illustratively, the amino group containing monomers can be employed in amounts ranging from about 1 to 10 percent by weight based on the total weight of the monomer composition.

The other monomer which is different from those described hereinabove can be an ester of acrylic or methacrylic acid, acrylonitrile, styrene, acrylamide methacrylamide or a mixture thereof. The particular monomer and the amounts in which it is employed will depend on properties that are imparted by the presence of said monomer. The selection of the particular monomer will be within the purview of one skilled in the art.

In the process for preparing the acrylic polymers of this invention, the ethylenically unsaturated monomers as described herein above are copolymerized by free radical addition initiated polymerization in a reaction medium comprising a solvent, a base and water.

Free radical initiators which are useful herein and preferably those which are soluble in the polymerization medium, for example, azobisisobutyro nitrile, azobutyronitrile, 2,2'-azobis(2,4-dimethyl valeronitrile) and ditertiary-butyl peroxide.

Chain transfer agents such as alkyl mercaptans, e.g., tertiary dodecyl mercaptan, and ketones such as methyl ethyl ketone, chlorohydrocarbons such chloroform can optionally be used.

The solvents useful herein are typically organic solvents. For water-based compositions, solvents which do not adversely affect water dispersibility are used. Examples of these solvents are the mono-alkyl ethers of ethylene with contents of 1 to 4 carbon atoms in alkyl group. For example, ethylene glycol monoethyl ether or ethylene glycol monobutyl ether. Examples of other suitable solvents are isopropanol, diacetone alcohol, ethylene glycol monohexyl ether and the like.

As aforestated, the reaction medium comprises in addition to the organic solvent, a base and water. An illustrative example of the base can be ammonia or an amine such as dimethyl ethanolamine, N-methylethanolamine, monoethanolamine, and triethylamine or morpholine. The proportions in which the organic solvent, the base and water are employed are such as would ensure that the monomers and the resulting copolymer, are compatible with the reaction medium. With particular reference to the amine, said amine is employed in amounts sufficient to prevent the N-methylol amide groups from self-condensation, or otherwise reacting prematurely to produce a gelable composition. Also, the amount of amine present in the reaction medium depends on the amount of carboxylic acid in the copolymer and to some extent depends on the amount of amine that is present in the copolymerizable monomers. In the reaction medium, the amine can be present in amounts of about 0.1 equivalent to 2 equivalents, and preferably 0.25 to 1, by equivalent of carboxylic acid. Water can be present in amounts of about 5 to 30 and preferably 10 to 20 percent by weight based on the total weight of the reaction medium.

It is of note that the amino group of the amino group containing monomer can also contribute towards the prevention of premature gelation. Hence, the presence of the amino group containing monomer can result in the use of lesser amounts of the base that is present in the reaction medium.

The resultant solution acrylic polymer has a weight average molecular weight of about 5,000 to 50,000 and preferably 10,000 to 30,000. Usually, the acrylic polymer is prepared at a solids content of about 50 to 75 percent and, for handling reasons, it is reduced to about 30 to 50 percent by addition of cosolvents and water to lower viscosity.

Ink compositions can be formulated with above acrylic polymers for use in flexographic or gravure printing. In addition to the acrylic polymer, the ink composition can contain other resinous compositions, pigments, solvents, water and other additives such as slip agents, surfactants and the like. Non-pigmented compositions thereof can be used as overprint varnishes. In their use, the acrylic polymers of this invention, can be employed in amounts of about 5 to 25% and preferably 10 to 20% solids, based on the total weight of the composition.

It has been found that the solution polymers of this invention, in their use, present over emulsion polymers, the following advantages:

1. They have good pigment wetting properties, so they are suitable for pigmentation by direct grinding of the pigment in the polymer.
2. The are suitable for the gravure printing process because when the ink of this invention partially dries in the cylinder of a gravure printer, it easily redissolves into the liquid ink. In contrast with emulsion polymers, plugging of the cylinder causes poor printability.

It is a distinct feature of the invention that the water-based inks described hereinabove can be used in printing on a variety of substrates such as paper and polyvinyl chloride. When the ink is applied to paper and air dried, the resultant printed matter has been found to have good soap and water resistance and other desirable properties. When the ink is applied to polyvinyl chloride and cured for a period of about 75 seconds at about 180° C., the printed matter has been found to have good alcohol resistance, excellent adhesion and other desirable properties. The above characteristics make the inks "washable", thus, they are very suitable for printing wall coverings. This and other aspects of the invention are further described by the following nonlimited examples.

EXAMPLE 1

This example illustrates the acrylic polymer of this invention and a method of preparing the same.

| Ingredients | Parts by Weight (in grams) |
| --- | --- |
| Part A | |
| 48% aqueous solution of N—methylolacrylamide | 183.3 |
| Part B | |
| Methyl methacrylate | 803 |
| Butyl acrylate | 374 |
| Styrene | 220 |
| Acrylonitrile | 495 |
| Dimethyl aminoethyl methacrylate | 110 |
| Methacrylic acid | 110 |
| Azobisisobutylnitrile | 44 |

In a 6 liter reaction flask charged with an agitator, a thermometer, a dropping funnel, and a vertical condenser was introduced 808.5 grams of propylene glycol methyl ether, 56.65 grams of dimethyl ethanol amine and 82.5 grams of deionized water. The above reaction charge was heated to about 100° C. to reflux. Thereafter, over a period of 3 hours, charges A and B were simultaneously but separately added. During the addition, the reaction mixture was continuously refluxed and at the end of the addition, the reaction mixture was held for 3 hours with a continuous reflux. Over this period of time at 30 minute intervals, there were added to the reaction mixture 3 separate portions of a mixture of 2.2 grams of azobisisobutylnitrile in 5.5 grams of propylene glycol monomethyl ether. At the end of this 3 hour holding period, the reaction mixture was cooled to 80° C. followed by the addition of 113.85 grams of dimethyl ethanol amine. The reaction mixture was then reduced with 1650 grams of ethanol and 715 grams of deionized water to produce an acrylic polymer solution having 40% solids, a viscosity of 20 poises and a pH of about 9.

The resultant acrylic polymer had a weight average molecular weight of about 17,000, as determined by gelpermeation chromatography using a polystyrene standard. The low polydispersity index (Mw/Mn=2.3) was illustrative of the low degree of self condensation of methylol groups.

The above polymer was formulated into a water-based ink composition and printed successfully on polyvinyl chloride coated paper, and on paper that was not coated with polyvinyl chloride, as follows.

The ink composition was formulated with the above acrylic polymer and other ingredients as follows.

| Ingredients | Parts by Weight (grams) |
| --- | --- |
| The above acrylic polymer | 40.60 |
| Water | 31.10 |
| Ethanol | 13.30 |
| Ethyl Cellosolve | 2.30 |
| Slip Ayd SL 295[1] | 3.50 |
| Zonyl FSN[2] | 0.10 |

-continued

| Ingredients | Parts by Weight (grams) |
| --- | --- |
| Pigment Paste | 9.10 |

[1] Polyethylene wax dispersion from Daniels Products.
[2] Fluorosurfactant available from E. I. Dupont.

The resultant ink composition was reduced with a blend of ethanol and water in a one to one ratio to a viscosity of 20 seconds as determined with a number 4, Ford cup. The ink composition was applied to paper and polyvinyl chloride to a wet film-thickness of 12 microns. The ink that was applied to paper was air-dried. The ink that was applied to the polyvinyl chloride was baked at 180° C. for 75 seconds. The ink that was applied to the paper was found to have good soap and water-resistance, in that soap and/or water applied to the dried film by means of a sponge did not dissolve the dried film. The ink that was applied to the polyvinyl chloride was found to have good adhesion in that it was not delaminated by cellulosic glue which was applied to the dried-film. Also, the ink on polyvinyl chloride was resistant to alcohols such as isopropanol.

EXAMPLE 2

This illustrates the acrylic polymer of this invention and methods of making and using the same in ink compositions in essentially the same manner as described in Example 1.

| Monomer Charge | |
| --- | --- |
| Ingredients | Parts by Weight (grams) |
| Part A | |
| 48% aqueous solution of N—methylolacrylamide | 137.5 |
| Part B | |
| Methyl methacrylate | 1540 |
| Butyl acrylate | 374 |
| Dimethylaminoethyl methacrylate | 110 |
| Methacrylic acid | 110 |
| Azobisisobutyronitrile | 44 |

In a 6 liters reaction flask were introduced 808.5 grams propylene glycol methyl ether, 56.65 grams of dimethylethamolamine and 110 grams of deionized water. Then the reaction was processed in essentially the same manner as described in Example 1 to obtain at the end of polymerization a theoretical solids content of about 67%. The reaction mixture was cooled to 80° C. followed by addition of 1650 grams of ethanol and 715 grams of deionized water to produce an acrylic polymer solution having 40% solids, a viscosity of 14 Poises and a PH of about 8.

The above polymer was neutralized and formulated into a water-based ink composition in essentially the same manner as described in Example 1. The resultant ink was printed on successfully on polyvinyl chloride coated paper and paper that was not coated with polyvinyl chloride.

Therefore, what is claimed is:

1. A water-reducible acrylic polymer consisting essentially of a copolymer of monomers:
   (i) an ethylenically unsaturated monomer containing an N-methylolamide group in an amount of from about 1 to 12 percent by weight based on the total monomer weight,
   (ii) an ethylenically unsaturated monomer containing a carboxyl group in an amount of from about 3 to 15 percent by weight based on the total monomer weight,
   (iii) an ethylenically unsaturated monomer containing an amino group in an amount of from 1 to 10 percent by weight based on the total monomer weight, and
   (iv) an ethylenically unsaturated monomer which is different from (i), (ii), and (iii), said copolymer being characterized by a low degree of self-condensation of methylol groups.

2. An acrylic polymer of claim 1, wherein the monomer is recited in (i) is N-methylolacrylamide or N-methylolmethacrylamide.

3. An acrylic polymer of claim 1, wherein the monomer as recited in (ii) is acrylic acid, methacrylic acid, or itaconic acid.

4. An acrylic polymer as recited in claim 1, wherein the monomer as recited in (iii) is aminoalkyl esters of acrylic or methacrylic acid.

5. An acrylic polymer of claim 4, wherein the monomer as recited in (iii) is N,N-dimethyl amino-ethyl methacrylate, N,N-dimethyl amino-ethyl acrylate, N,N-diethyl amino-ethyl methacrylate, t-butyl amino-ethyl methacrylate, N-methyl-N-butyl amino-ethyl methacrylate or N,N-dimethyl amino-hexyl acrylate.

6. An acrylic polymer of claim 1, wherein the monomer of (iv) is an ester of acrylic or methacrylic acid, acrylonitrile, styrene, acrylamide methacrylamide or a mixture thereof.

7. A process for preparing the acrylic polymer of claim 1, comprising copolymerizing the ethylenically unsaturated monomers of claim 1, by free radical initiated polymerization in a basic solvent medium.

8. A process of claim 7, wherein the basic solvent medium comprises an organic solvent, water, and a base.

9. A process of claim 8, wherein the organic solvent is alkylene glycol monoethyl ether or methyl ethyl ketone.

10. A process of claim 8, wherein the base is ammonia or an amine.

11. An aqueous composition comprising the acrylic polymer of claim 1, which is at least partially neutralized with a base.

12. An ink composition containing an acrylic polymer of claim 1.

13. In an improved process of applying as a varnish or ink composition to a substrate, the improvement comprising effective application to varied substrates of polyvinyl chloride-coated paper and paper which is not coated with polyvinyl chloride, wherein the varnish or ink composition comprises an aqueous composition comprising an acrylic polymer as recited in claim 11.

14. In an improved process of claim 13 which comprises applying as a varnish or ink composition to a substrate comprising polyvinyl chloride-coated paper, followed by baking the substrates to a temperature sufficient to effect cure.

15. A printed matter which is prepared by the process of claim 13.

16. A printed matter which is prepared by the process of claim 14.

* * * * *